(12) United States Patent
Lang

(10) Patent No.: US 7,149,712 B2
(45) Date of Patent: Dec. 12, 2006

(54) METHOD FOR FINANCING FUTURE NEEDS

(76) Inventor: Alan J. Lang, 5551 Ridgewood Dr., Ste. 201, Naples, FL (US) 34108

( * ) Notice: Subject to any disclaimer, the term of this patent is extended or adjusted under 35 U.S.C. 154(b) by 75 days.

(21) Appl. No.: 10/905,275

(22) Filed: Dec. 23, 2004

(65) Prior Publication Data

US 2005/0086144 A1   Apr. 21, 2005

Related U.S. Application Data

(63) Continuation-in-part of application No. 10/287,050, filed on Nov. 1, 2002, now abandoned.

(51) Int. Cl.
G06Q 40/00 (2006.01)
(52) U.S. Cl. ............................. 705/35; 705/4
(58) Field of Classification Search .................. 705/35, 705/36, 36 R, 4, 38, 37
See application file for complete search history.

(56) References Cited

U.S. PATENT DOCUMENTS

| | | |
|---|---|---|
| 5,742,775 A | 4/1998 | King |
| 5,966,693 A | 10/1999 | Burgess |
| 6,017,063 A | 1/2000 | Nilssen |
| 6,049,772 A | 4/2000 | Payne |
| 6,148,293 A | 11/2000 | King |
| 6,192,347 B1 | 2/2001 | Graff |
| 6,343,272 B1 | 1/2002 | Payne |
| 6,611,815 B1 * | 8/2003 | Lewis et al. ............. 705/36 R |

FOREIGN PATENT DOCUMENTS

JP       2002334164 A  * 11/2002

OTHER PUBLICATIONS

Anonymous, "United Funeral Directors provides insurance plans for final expenses", Times Record News, Wichita Falls, Texas, Jul. 31, 1993, 2 pages.*
Fowler, Deborah, "Don't wait until it's too late/ To spare your loved ones needless distress and save them some money too", Houston Chronicle, Houston, TX, Aug. 19, 1996, p. 1.*
Wiles, Russ, "Wall Street, Callifornia; Niche Guys; Whatever the idea, it seems, someone has or will probably try to build a fund around it", The Los Angeles Times, Los Angeles, CA, Jun. 3, 1997, p. 7.*
Anonymous, File 9 (Business and Industry), No. 2715089, "Investment Products: A Big Boost for VA Heirs (Sun Life of Canada is launching a variable annuity (VA)", Financial Service Marketing, Jan. 2000, vol. 2, No. 1, p. 11.*
Walsh, Bill, "Final Arrangements Series: Grave Concerns, part 1 of 2:[Orleans Edition]", Times-Picayune, New Orleans, LA, Apr. 9, 2000, p. A 16.*
Buggs, Shannon, "Prepaid funerals not financial boon:[2 Star Edition]", Houston Chronicle, Houston, TX, Oct. 23, 2000, p. 1.*

* cited by examiner

*Primary Examiner*—Vincent Millin
*Assistant Examiner*—Dan Kesack
(74) *Attorney, Agent, or Firm*—Sughrue Mion, PLLC

(57) ABSTRACT

A method for financing future intentions of a first party (1, 15) pursuant to a first contract (4, 18) with a second party (2, 16) for a specified monetary sum. A contract (5, 19) involving a variable annuity is obtained from a third party (3, 17). A guaranteed benefit equal to at least the specified monetary sum is paid to the second party by the third party to pay for the fulfillment of the future intentions of the first party. The variable annuity has a guaranteed annual increase.

14 Claims, 7 Drawing Sheets

METHOD FOR FINANCING FUTURE NEEDS

CROSS REFERENCE TO RELATED APPLICATIONS

This application is a continuation-in-part of U.S. application Ser. No. 10/287,050, filed on Nov. 1, 2002 now abandoned, the disclosure of which is incorporated herein by reference.

BACKGROUND OF THE INVENTION

This invention relates to financial business methods and systems, and more particularly to a method and system for financing future needs or intentions upon the death of a person. Additionally, it relates to a method and system for investing long-term assets of private and public foundations and nonprofit organizations such as 501(c)(3) tax exempt charities.

There are many problems associated with financing for future needs, intentions or requirements, including, without limitation, funeral service, burial services and monies already placed in trust to meet these needs. Heretofore, the conventional method of paying for funeral and burial services has been for a person to enter into a contract which stipulates services including the casket, embalming, transportation, flowers, cemetery, and related items, for an agreed-upon monetary sum. Pursuant to such a contract, a person would normally pay a lump sum at the time of contracting or agree to make timely payments until the price has been paid in full. These payments have heretofore been made directly to the funeral home or cemetery contracting for the services and merchandise selected, in an attempt to avoid the necessity of the deceased's family having to make last-minute decisions at a time when they are most vulnerable and the least able emotionally to make such decisions. Furthermore, it would save money by avoiding the costs of inflation.

Some of the major issues relating to the payment in advance for future services concern portability, cancellations, additional costs not disclosed up-front, refundability, and lack of ability to change or alter the services needed by the client, such as changing the burial plan to a crematory plan. Present practices either result in an outright forfeiture of all the money paid or severe penalties when some or all of the above occur. Moving of elderly parents from one state to another in order for the children to care for them has been a major cause of the "portability" problem. Funeral homes simply do not have the ability to transfer the contracts to other states.

Basically, there have been no federal regulations governing pre-need arrangements. Therefore, every state has established its own unique set of rules and regulations to govern and regulate this industry. Sometimes a funeral home has expended all the monies paid for a particular service, then goes out of business and does not have the money to provide those services upon the death of a person. Often the family has to pay additional monies at the time of the death to provide those services. To combat the problem, most states have required that the funeral home or cemetery selling these services must place in a trust account varying amounts of the monies paid in advance for pre-need policies.

This has led to even more problems with the monies required to be placed in trust accounts and the ability of the funeral home to access those funds. In cases of outright fraud, some funeral homes and cemeteries simply refuse to put the money into trust accounts until they are discovered. Some states require 100% of the monies be placed in trust and others only require as little as 50% be placed in trust. Some states allow annual withdrawals of amounts placed in trust. Furthermore, many funeral homes have requirements concerning trust funds that differ from the cemetery's requirements concerning trust funds, and, furthermore, "services" have requirements for handling trust funds that differ from "merchandise" providers.

Because of the attempts by the states to curb abuses and fraud in the handling of these trust funds, restrictions on how the money may be invested and who must be employed to manage the funds, the actual returns on the money placed in trust is, at best, three percent (3%) annually when the stock market and interest rates are normal. In some cases, even this small amount is consumed by management fees and administrative charges. In recent times, there have been losses in these accounts resulting in funeral homes being required to provide services that cost them more than they received for the original contact.

A similar, but slightly different, need arises in the nonprofit world. Certain charitable gifting programs are designed to provide monies to the charities upon the death of the donor. Good examples of these programs are charitable remainder trusts, charitable gift annuities, charitable lead trusts and pooled income funds. Permanent endowment funds and donor advised funds are meant to provide income but must also preserve the original principal in order to do so.

Presently, however, nonprofits must accept market risk of losses. Along with losses comes a corresponding drop in annual income. Because of this risk, they are forced to allocate a large proportion of their assets to "safe", low return, fixed income type investments. These types of investments offer no growth potential to the principal, only a perception of "safety" because of the guaranteed return of principal along with a fixed-dollar annual return. This leaves less money to be invested for growing the principal. The annual income, under this conventional approach, is thus restricted to these low-yielding investments.

Combine this "safe," principal-protecting strategy with the losses in the principal that occur during market downturns, recessions, and the like, and the result may typically be a declining annual cash flow with which to fund the nonprofit's programs. This annual income is key to funding both the day-to-day operations of the nonprofit as well as the programs they are designated to administer. (Scholarships, payments to donors, charitable programs).

Thus, a need exists for a method and system that will eliminate the foregoing problems concerning pre-need financing. The prior art includes the following U.S. Patents (all of which are incorporated herein by reference for their useful background information involving financial systems, and especially for their useful background information relating to the use of computers in such systems), none of which is like the present invention:

| U.S. Pat. Nos. | INVENTORS | ISSUE DATE |
| --- | --- | --- |
| 6,017,063 | Nilssen | Jan. 25, 2000 |
| 5,742,775 | King | Apr. 21, 1998 |
| 6,343,272 | Payne et al. | Jan. 29, 2002 |
| 6,192,347 | Graff | Feb. 20, 2001 |
| 6,148,293 | King | Nov. 14, 2000 |
| 6,049,772 | Payne et al. | Apr. 11, 2000 |
| 5,966,693 | Burgess | Oct. 12, 1999 |

SUMMARY OF THE INVENTION

One object of the present invention is to provide the numerous benefits to both the person needing the future services (hereinafter referred to as the "Client"), and the "Second Party" (the entity providing the services), among those benefits being the following:

The Client is not required to pay any amount "up-front" to the Second Party, which eliminates the need for current trust revisions;

The Client has control of the contractual arrangements with the Second Party until the Client's death;

The Client then may move anywhere at any time without having to request or negotiate a refund;

The Client may change the beneficiary (i.e. the funeral home or cemetery) at will;

The Client may change the Second Party providing the services at will;

The contractual arrangement is tax-deferred and the Second Party (as beneficiary) is responsible for any income taxes;

The contractual arrangement is not subject to probate, eliminating any delay in payment to the funeral home or cemetery due to court proceedings;

The Client's money for future services is 100% invested in mutual funds which are held in a separate account by the insurance company, eliminating the possibility of being spent or attached by creditors in the event of bankruptcy;

The Second Party is protected against inflation by the guaranteed annual increase of the death benefit;

The Second Party receives a guaranteed minimum rate of return to help cover the ever-increasing future costs of providing the services;

The Second Party is additionally benefitted by any and all increases in the market value of the mutual fund investments because, at the death of the Client, it will receive the highest of the guaranteed minimum increase or the market value of the investments; and The Second Party is entitled to 100% of the death benefit proceeds in the contract.

The present method and system achieves the above objectives and benefits by providing a method and system to finance future needs involving two contractual arrangements instead of the conventional one contractual arrangement currently in use. The first contractual arrangement is between the Client who needs future services and/or goals and a Second Party that can provide for the future needs and services. The second contractual arrangement is between the Client (or, in some cases, the Second Party) and a Third Party to provide a monetary sum to pay for those needs upon the death of a Client.

Under this system, a Client who must provide for future needs enters into a contract with a Second Party capable of providing the future needs desired by the Client for a fixed monetary sum. Then, the Client will enter into a Variable Annuity Contract (VA) with the Third Party. Among other things, the contract provides an increasing death benefit guarantee equal to the monetary sum to meet the cost of needs and services being provided by the Second Party. The Second Party must be named as the Beneficiary of this VA contract. Upon the death of the Client, the Third Party arranges for payment to the Second Party. In most cases, the Second Party would be a funeral home or provider of burial services or an existing pre-need trust account. If the Second Party is a non-profit beneficiary such as a charitable trust or endowment, the Second Party may use money donated by the Client to purchase a variable annuity contract providing similar benefits.

The above and other objects, features and advantages of the present invention should become even more readily apparent to those skilled in the art upon a reading of the following detailed description in conjunction with the drawings, wherein illustrative embodiments of the invention are shown and described.

BRIEF DESCRIPTION OF THE DRAWINGS

In the following detailed description, reference will be made to the attached drawings in which.

DESCRIPTION OF THE PREFERRED EMBODIMENTS

First Embodiment

Figure 1:
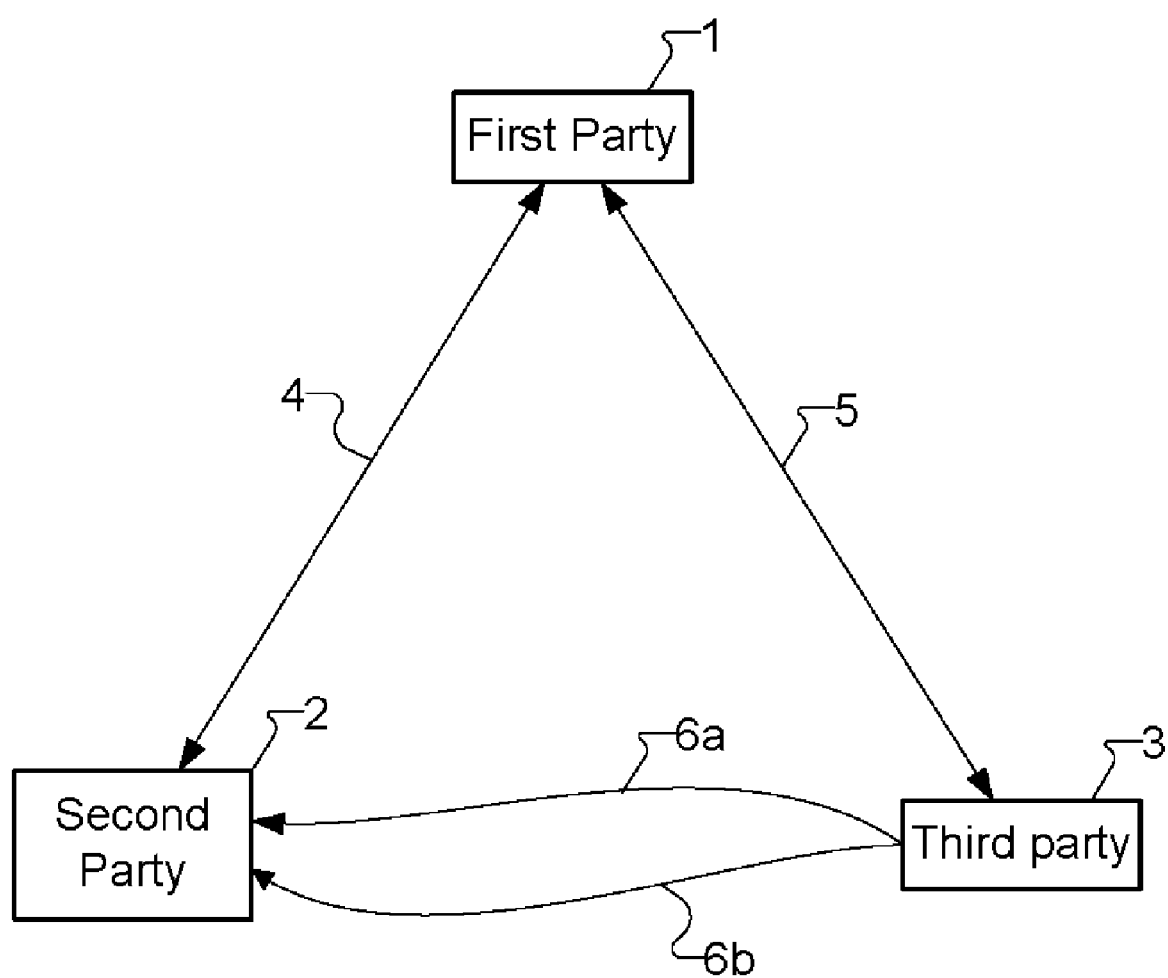
FIG. 1 is a block diagram illustrating a first embodiment of the present invention.

FIG. 1 shows a first exemplary embodiment of a system and method according to the invention. This embodiment is directed generally to the situation in which an individual is planning for his burial needs, although this scenario is not the only one in which the system according to FIG. 1 may be effectively employed.

In FIG. 1, a First Party 1 is an individual planning for his burial needs. It will be appreciated that any of a myriad of future needs may be planned for, including the fulfilling of intentions or requirements in a general sense. A Second Party 2 may be thought of as a funeral home or any entity capable now or in the future of meeting the needs of the First Party 1. The First Party 1 and the Second Party 2 enter into an agreement 4 to fulfill the intentions of the first party. The agreement involves a monetary sum.

A Third Party 3 represents an individual or entity, and is capable of providing or arranging for a Variable Annuity Contract 5. The Variable Annuity Contract 5 has a guarantee death benefit corresponding to the amount of the monetary sum that is the subject of agreement 4. The Variable Annuity Contract 5 also has a guaranteed increase in the death benefit.

This system thus involves two contractual arrangements: The first contractual arrangement is between the First Party 1 and the Second Party 2 which specifies the needs the First Party wishes to have fulfilled and at what price the Second Party 2 agrees to fulfill those needs. The second contractual arrangement 5 is between the First Party 1 and the Third Party 3 to provide a variable annuity to pay the specified price to the Second Party 2 to fulfill the needs of the First Party 1. Under the second contract 5, the First Party 1 deposits a lump sum necessary to obtain a variable annuity contract that will yield a payment 6a, upon the death of the First Party 1, of the monetary sum due under the first contract 4.

The Variable Annuity Contract (VA) 5 has certain characteristics. It pays a guaranteed death benefit with a guaranteed increase. That is to say, it may increase by a minimum set percentage (usually between 5% and 7%) annually and permanently lock in the increase on every anniversary date of the contract, to be paid as an amount 6b to the Second Party 2 upon the death of the First Party 1. Additionally, the VA 5 may include an immediate bonus (usually 3% to 5%; this actually amounts to a "discount" of 3% to 5% for the client) that is added to the deposited amount, depending on the age of the Client 1. The Second Party 2 which may be a funeral home, cemetery, trust, or the like, is then named as the sole beneficiary of the VA 5 and is entitled to receive all of the profits from the VA 5. The First Party 1 remains the owner and annuitant of the VA 5, thus retaining all power and control over changes in the VA's beneficiary during the life of the First Party 1, a distinct advantage over conventional contractual arrangements because the costs involved are now guaranteed by the death benefit (death benefit 6a is now guaranteed). As a separate part of the new contract, the money may be safely invested in mutual funds for maximum market growth. The Second Party 2 is now assured that it will never receive less than a 5% to 7% growth 6b on the deposited amounts and possibly may receive even more (also represented by 6b) if the underlying mutual funds grow at a higher rate.

The second contract between the First Party 1 and the Second Party 2 may also include provisions which set forth the penalties the First Party may face in the event the VA 5 contact is cancelled or changed in any way, or if the First Party 1 should change the Beneficiary to anyone other than the Second Party 2. The Second Contract may also contain provisions that will relieve the Second Party 2 from any contractual obligations under the contract for services in the event any of these contingencies occur.

Notwithstanding such provisions, however, if the Second Party 2 is a funeral home, cemetery or trust, upon the death of the First Party 1 the Third Party 3 will arrange for all death benefits (6a and 6b) of the VA 5 to be paid to the Second Party 2. The Second Party 2 will then have the money to provide the goods and services associated with the death of the First Party 1, such as a casket and/or cemetery lot, funeral services, and related items.

Figure 2:
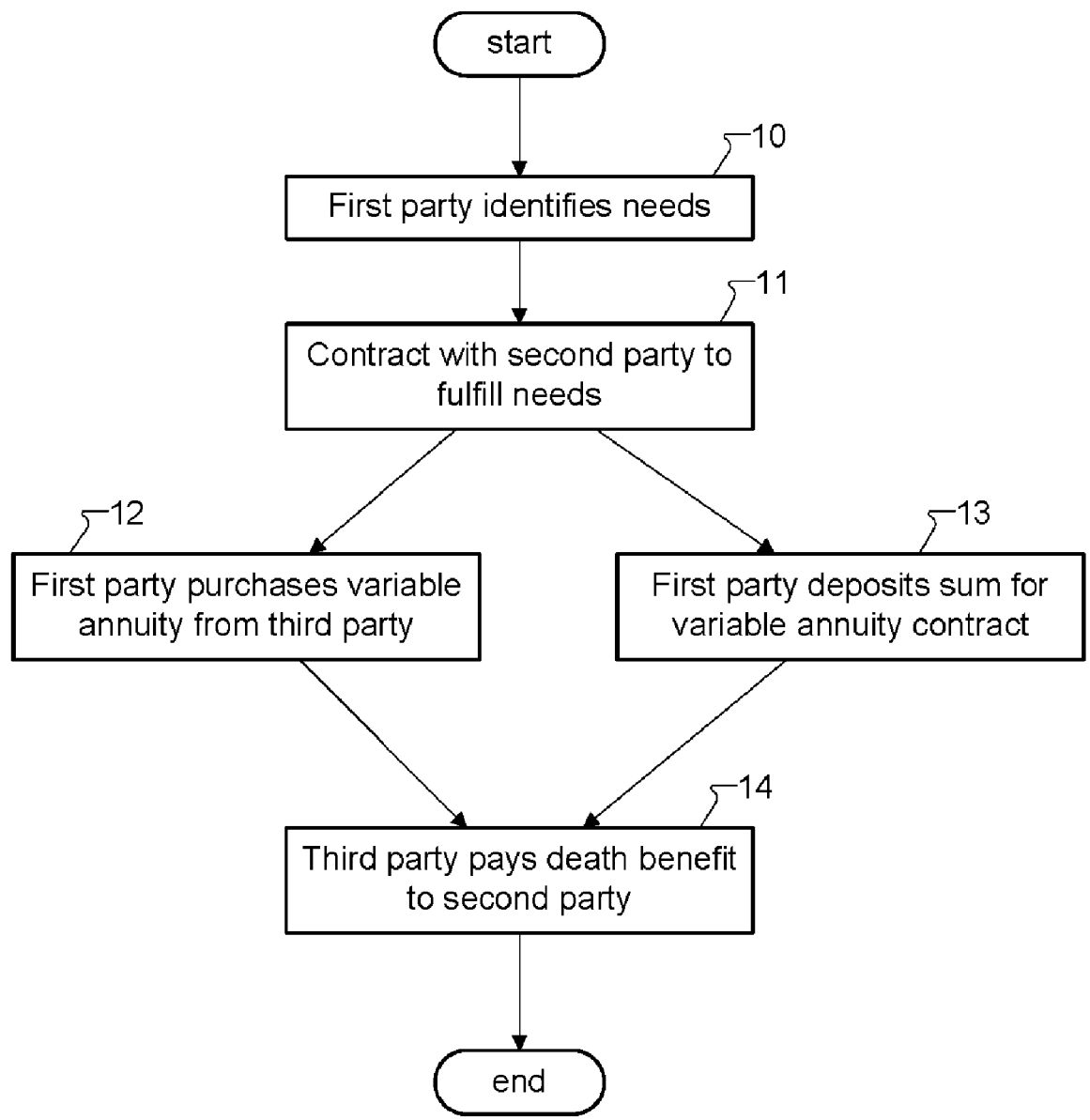
FIG. 2 is a flow diagram showing a method according to the first embodiment.

FIG. 2 shows an exemplary flowchart of steps that may be followed to realize a method of financing future needs according to the system shown in FIG. 1. In particular, in step 10, the first party 1 identifies needs. In step 11, the first party 1 enters into an agreement 4 with a second party 2 to fulfill the intentions/needs desired by the first party, for a monetary sum. In step 12, the first party 1 purchases a variable annuity contract 5 from a third party 3; the contract has a guarantee death benefit 6a corresponding to the amount of the monetary sum, and a guaranteed annual increase 6b in the death benefit. It will be understood that, as is conventional in the industry, important aspects of the contract will be recorded in a computer system (discussed below with respect to FIG. 7) in a manner familiar to one skilled in this field. In step 12, therefore, the guarantee death benefit and guaranteed annual increase may be recorded in such a computer system. In step 13, the first party deposits the sum to purchase the variable annuity contract. In step 14, after the death of the first party (not shown), the third party pays the guarantee death benefit 6a to the second party, to pay for fulfilling the intentions/needs desired by the first party. It will be appreciated that the amount will be calculated by a conventional computer system such as the one mentioned above. The calculated amount 6b will be based on a variety of possible factors including at least the guaranteed annual increase and the timing of the death of the first party. In practice, the calculated amount will also be based on the market value of the investment as well.

The foregoing steps need not necessarily be performed in precisely the order specified in FIG. 2.

Although an embodiment of the present invention has been described primarily in relation to a funeral home business, it is intended that the invention more generally apply to any situation in which a first party has needs that must be fulfilled when said party becomes deceased.

Second Embodiment

Figure 3:
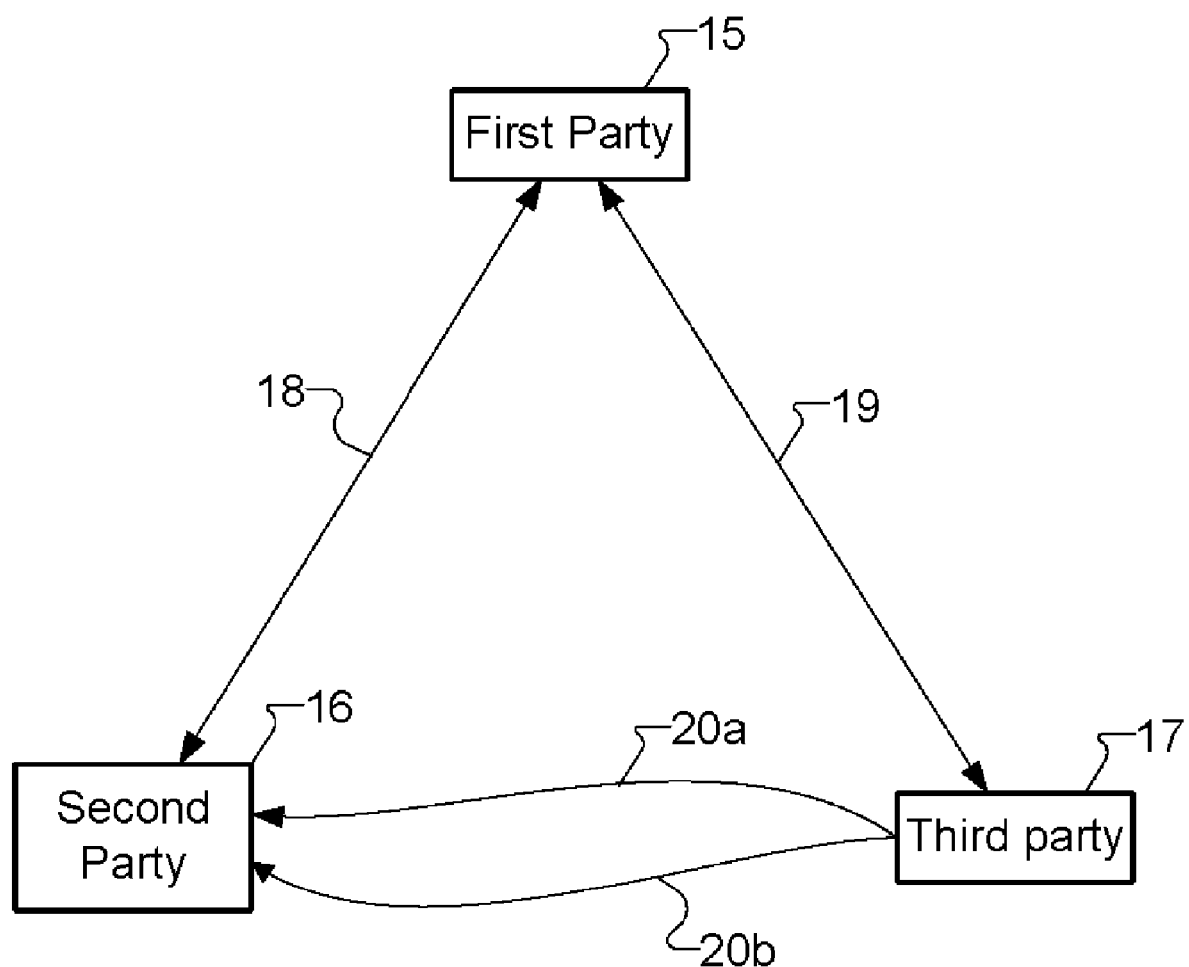
FIG. 3 is a block diagram illustrating a second embodiment according to the invention.

In another embodiment of the invention, there is now described the application of the present invention to a first charitable situation, illustrated in FIG. 3.

A first party donor 15 identifies the need for a charitable contribution to a second party charity 16 which could be a permanent endowment fund, charitable remainder trust, charitable lead trust, pooled income fund, charitable gift trust, donor advised trust, or the like. The aforementioned may be thought of as "long term" types of investments and demand protection of principal and a guaranteed income stream. The First Party 15 enters into a contract 18 for a charitable contribution which, in the case of "donor advised funds", provides that the First Party 15 is to direct the annual gifting. Under conventional practice, a charity 16 would then invest the contribution into a combination of stocks and/or bonds, and accept the usual risks of fluctuating interest rates and the rise and fall of the stock market and bond values.

In this embodiment of the present invention, however, one of the first party 15 or second party 16 purchases a VA 19 from third party 17. The VA 19 has a guaranteed death benefit 20a with a guaranteed annual increase. In cases where a guaranteed annual cash flow is required (i.e. permanent endowment fund) this annual increase 20b is actually available to be withdrawn every year. The net result is the amount withdrawn is subtracted from the increased death benefit resulting in a return of the death benefit to the original amount deposited. This guarantees the safety of the original principal, provides a non-fluctuating or stable minimum annual cash flow, and allows maximum investment in mutual funds or the like to capture any growth above the minimum guaranteed increase in the death benefit.

One similarity between this second embodiment and the first embodiment is that the guarantee death benefit 20a is still paid from the third party 17 to the second party 16 upon the death of the first party 15. One difference is that at least the guaranteed increase 20b may be paid to the second party 16 before the death of the first party 15.

Figure 4:
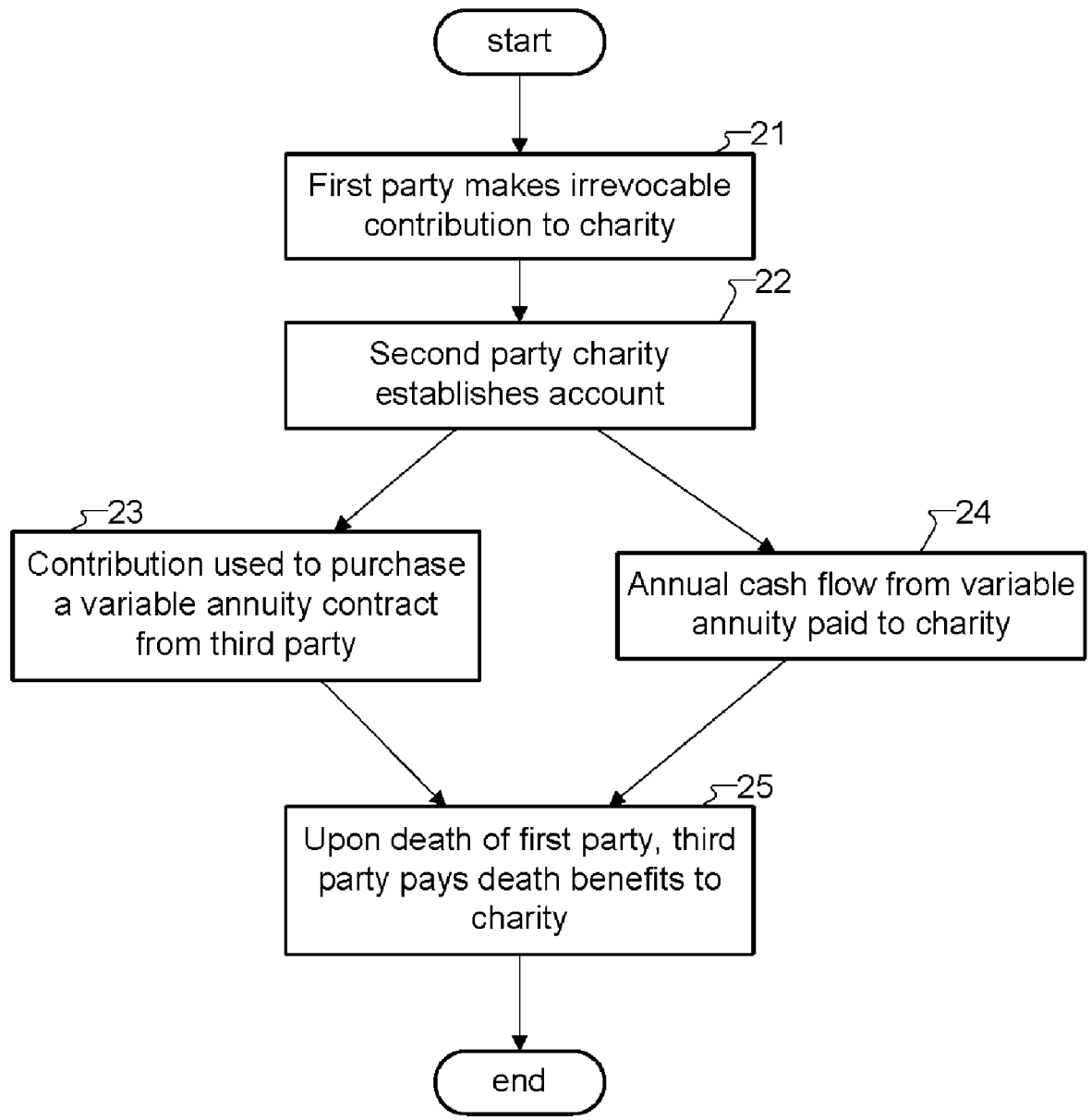
FIG. 4 is a flow diagram showing a method according to the second embodiment.

FIG. 4 illustrates the major steps involved in the system as applied to this second embodiment of the invention. First, in step 21, the first party donor 15 makes an irrevocable contribution to the second party charity 16, usually under Section 501(c)(3) of the Internal Revenue Code, with contractual specifications 18 or instructions as to the purpose of the donation.

Next, in step 22, the second party charity 16 establishes an account for the first party/donor and provides a tax deductible receipt for the donation.

Next, in step 23, the contribution is used to purchase a variable annuity contract 19 from a third party 17. The second party charity 16 is named as the Owner and Beneficiary while the first party 15 donor is usually named as an "annuitant", depending on the Donor's age at the time of the initial contract. A unique feature of the "annuitant" in all VAs is that it may be anyone, due to the fact that it does not have any ownership rights, interest in, or control over the contract. In the cases of trust-owned annuities (which is the case with substantially all charities or foundations) the "annuitant" is merely lending its life expectancy to the organization because the death benefits will be paid upon the annuitant's death. The reason for this is that a trust cannot die; therefore, there must be a living person upon which to base the death benefits.

Next, in step 24, after a set period of time, usually one day after the anniversary of the variable annuity contract (and each year thereafter), the annual cash flow under the variable annuity contract is paid 20b to the charity. The variable annuity contract also carries a guaranteed step-up of the death benefit. An annual review is normally performed, involving a comparison of market value of the annuity to the death benefit of the annuity to determine whether any increases in the annual cash payment should be made.

In step 25, upon death of the first party annuitant, the guaranteed death benefits 20q are paid by the third party to the second party charity. A major advantage of the present system, contrary to conventional arrangements, is that all the money from the first party donor is held in an insurance company separate account and is not subject to the creditor's claims, either of the insurance company or the third party.

It will be appreciated that the variable annuity contract is handled in a manner well known to those familiar with this general field, namely, by recording certain information in a computer system. In particular, the guarantee death benefit and guaranteed annual increase may be recorded in a computer system. The use of a computer system is important because it permits the large scale handling of administration of the annuities, and because it facilitates the calculation of the amount to be paid upon the death of the first party. In particular, the calculation by the computer system will determine an amount to pay, and the amount will be based on a variety of factors including, but not limited to, the guaranteed annual increase and also the timing of the death of the first party. Amounts paid during the life of the first party may take into account the timing of death of the first party by noting that the timing is yet to occur. Thus, "the timing of the death of the first party" is meant to be broadly understood.

Third Embodiment

Figure 5:
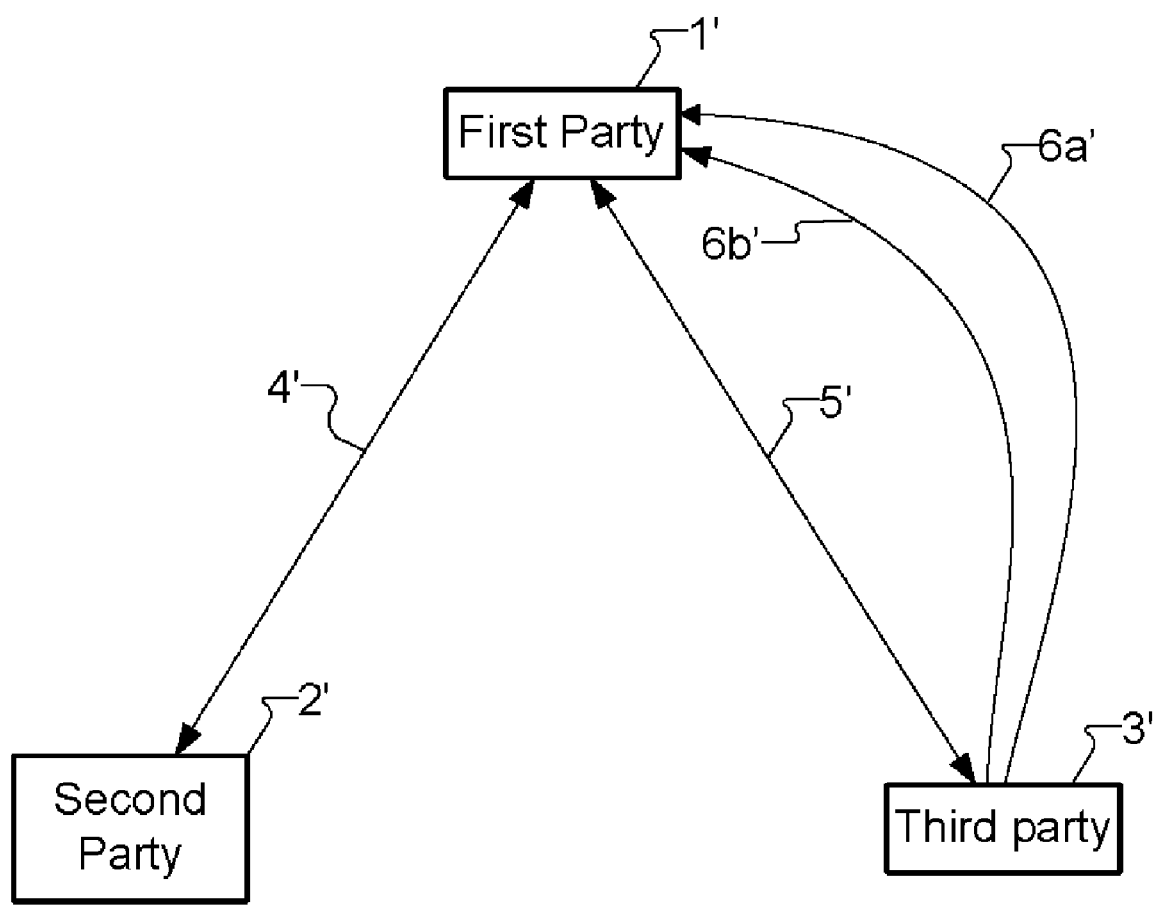
FIG. 5 is a block diagram illustrating a third embodiment according to the invention.

FIG. 5 shows a third embodiment according to the invention, involving a second charitable scenario. In FIG. 5, the roles are changed as follows: the First Party 1' is an entity, such as a non-profit, charity, church, or the like (for the sake of example only, a church will be used in this example); the Second Party 2' is a natural person, and may be a member of the church or not; the Third Party 3' is unchanged from the previous examples.

According to this exemplary embodiment, the church oversees an endowment fund or the like. The First Party church 1' has the intention of growing the principal and also having a cash flow. To this end, in accordance with the invention, the First Party church 1' makes an agreement 4' with the Second Party member 2'to fulfill the First Party's intention of growing the principal while having cash flow. Under the agreement 4', the First Party church 1' names the Second Party member 2' as an annuitant in a VA 5' purchased from the Third Party 3'. As in the second embodiment, the annuitant (here the Second Party member 2') has no ownership rights, and serves only as a basis for the VA 5' in terms of the calculation of the life expectancy and determination of when the guarantee death benefit 6a' of the VA 5' is to be paid. The VA 5' includes a guaranteed increase in the death benefit, and the First Party church 1' achieves an annual cash flow by annually taking payment 6b' of the guaranteed increase. When the Second Party member 2' dies, the guarantee death benefit 6a' is paid to the First Party church 1'. Of course, if the value of the principal has a market value higher than the guarantee death benefit (due to wise investing of the principal, or the like), the market value of the principal 6a' is paid to the First party church 1'.

In the case where the First Party 1' is a charitable remainder trust or the like, the cash flow 6b' might be directed to be paid to a lifetime beneficiary, which may conveniently be the Second Party 2'. Thus when the lifetime beneficiary dies, the trust pays the death benefit 6a' to a designated charity.

Fourth Embodiment

Figure 6:
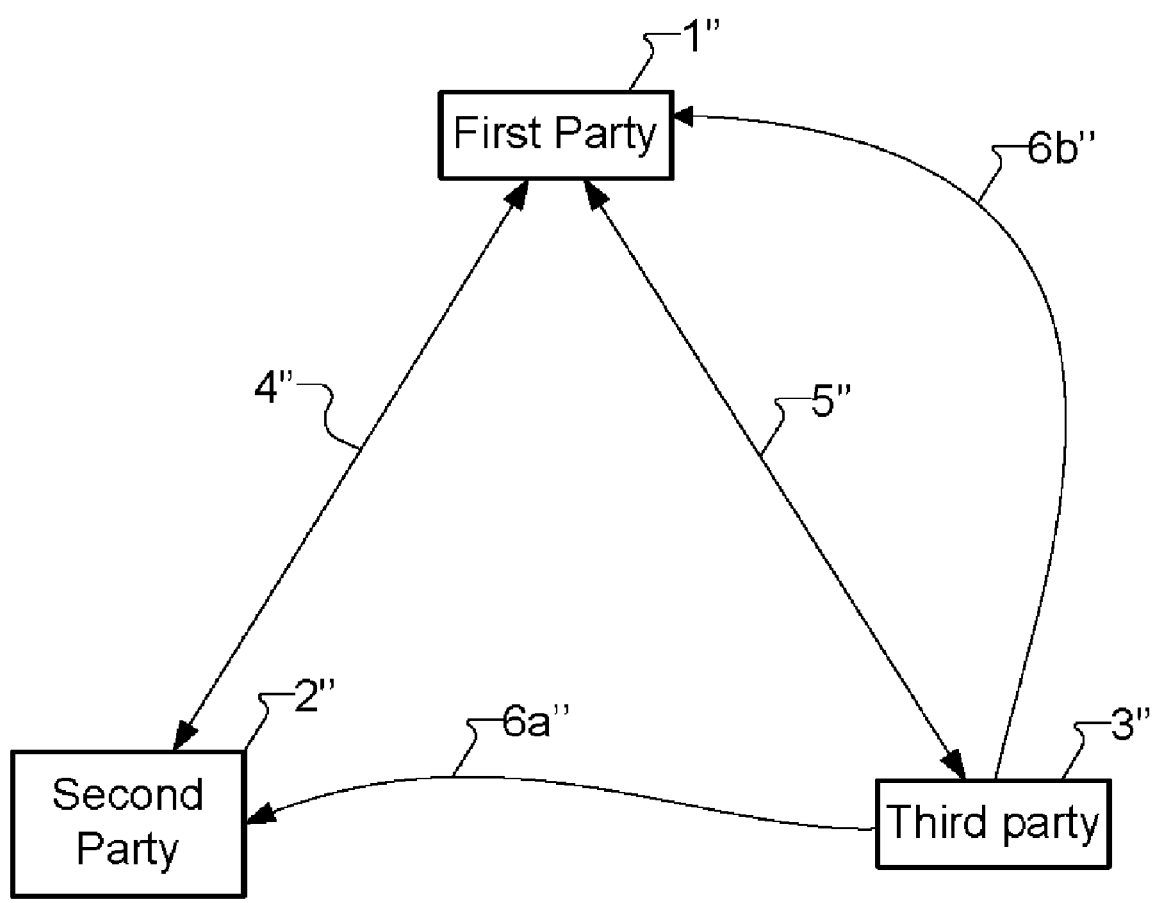
FIG. 6 is a block diagram illustrating a fourth embodiment according to the invention.

FIG. 6 shows a fourth embodiment according to the invention, involving a third charitable scenario. In FIG. 6, the First Party 1" is a person who purchases a VA 5" that pays the cash flow 6b" to himself while alive, and pays the guarantee death benefit 6a" to a Second Party charity upon the First Party's death. The VA 5" has a guaranteed increase, so that the First Party can plan on at least a minimum cash flow 6b".

Technological Notes

Figure 7:
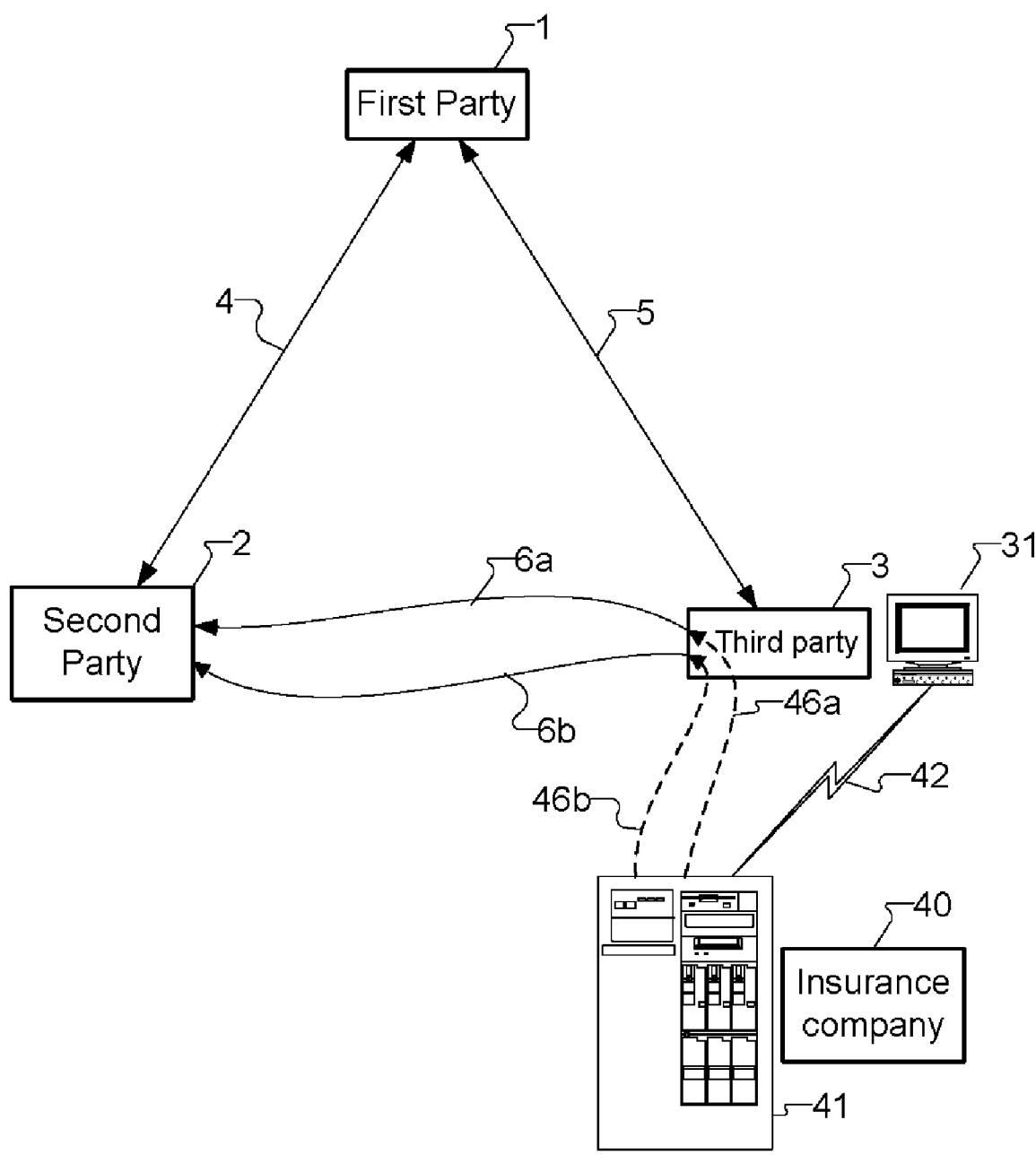
FIG. 7 is a high-level schematic illustrating a concrete example according to the first embodiment of the invention.

FIG. 7 shows the same arrangement as FIG. 1, with some annotations to describe at a very high level the manner in which a small aspect of the invention may be implemented in a concrete sense. That is to say, FIG. 7 gives just one example of how to realize the system at the Third Party 3. More particularly, Third Party 3 may be a financial services company with a computer system 31. The VA contracts may be actually provided by an insurance company 40. The insurance company 40 may have dealings with thousands and thousands of individuals and financial services companies, and may have a computer system 41 to facilitate record keeping, compliance, payment processing, and the like. The computer system 31 of the Third Party 3 may communicate with the computer system 41 of the insurance company 4 by any type of networking system 42, including but not limited to the Internet. To implement the VA 5 in a concrete manner, at least the guarantee death benefit and the guaranteed increase may be recorded in the computer system of the Third Party, or the computer system of the insurance company, or both. Here, the insurance company and the financial services company may be thought of generally, together, as the Third Party.

When it comes time to calculate the guaranteed increase, the computer system performs this calculation. In practical terms, this means carrying out arithmetical operations according to a manner well known in the financial arts, and arriving at a calculated amount. The amount depends upon when the First Party died, and may involve (in the first exemplary embodiment) a determination of the growth of the value over a number of years.

Also, the computer system must determine whether the market value of the principal is greater or less than the guarantee death benefit, because the VA 5 requires that the greater amount be paid. This involves not only retrieving the guarantee death benefit and guaranteed increase from the computer system's records, but also calculating current market value as of the death of the First Party 1. The calculation of current market value, although possibly straightforward, may involve such activities as retaining a database of values of market securities on various dates in the past, and a database of the amount of various securities in which the funds of the VA 5 are invested, and making numerous calculations to arrive at a market value. Such calculations are based on the timing of the death of the First Party.

The payment of the guarantee death benefit 6*a* by the financial services company may be preceded or replaced by a first payment transaction 46*a* from the insurance company, and likewise for the increase 6*b* and a second payment transaction 46*b* from the insurance company.

Although only a few embodiments of the present invention have been described in detail herein above, all improvements and modifications to this invention within the scope or equivalents of the claims are included as part of this invention. The scope of the invention is not meant to be limited by the specific embodiments mentioned above. The embodiments are provided merely to teach the invention, and not to limit the invention. Therefore, the claims should be consulted to determine the scope of the invention.

What is claimed is:

1. A method for financing future needs of a first party, comprising:
    the first party entering into an agreement with a second party to fulfill intentions of the first party, the agreement involving a monetary sum;
    purchasing a variable annuity contract from a third party, the variable annuity contract having a guarantee death benefit corresponding to the amount of the monetary sum and having a guaranteed increase in the death benefit, at least the guarantee death benefit and the guaranteed increase being recorded in a computer system; and
    the third party paying at least the guarantee death benefit to the second party upon the death of the first party, and also paying to the second party an amount calculated by the computer system, the amount being determined based on the guaranteed increase and on a timing of the death of the first party.

2. The method of claim 1, wherein the second party is a funeral home.

3. The method of claim 1, wherein the second party is a cemetery.

4. The method of claim 1, wherein the second party is a funeral trust.

5. A method for financing future needs, comprising:
    a first party entering into an agreement with a second party to fulfill intentions of the first party, the agreement relating to a monetary sum;
    purchasing a variable annuity contract from a third party, the variable annuity contract having a guarantee death benefit corresponding to the amount of the specified monetary sum and having a guaranteed increase in the death benefit, at least the guarantee death benefit and the guaranteed increase being recorded in a computer system; and
    the third party paying to the first party an amount calculated by the computer system, the amount taking into account the guaranteed increase;
    upon the death of the second party, the third party paying to the first party at least the guarantee death benefit recorded in the computer system.

6. The method of claim 5, wherein the first party is a non-profit organization.

7. The method of claim 5, wherein the first party is a charitable entity.

8. The method of claim 5, wherein the first party is a charitable trust.

9. The method of claim 5, wherein the first party is a pooled income fund.

10. The method of claim 5, wherein the first party is a charitable gift annuity.

11. The method of claim 5, wherein the first party is a charitable lead trust.

12. The method of claim 5, wherein the first party is a permanent endowment fund.

13. The method of claim 5, further comprising the first party paying the calculated amount to the second party during the life of the second party.

14. A method for financing future needs, comprising:
    a first party entering into an agreement with a second party to fulfill intentions of the first party, the agreement relating to a monetary sum;
    purchasing a variable annuity contract from a third party, the variable annuity contract having a guarantee death benefit corresponding to the amount of the specified monetary sum and having a guaranteed increase in the death benefit, at least the guarantee death benefit and the guaranteed increase being recorded in a computer system; and
    the third party paying to the first party an amount calculated by the computer system, the amount taking into account the guaranteed increase, the calculated amount being paid to the first party during the life of the first party;
    upon the death of the first party, the third party paying to the second party at least the guarantee death benefit recorded in the computer system.

* * * * *